United States Patent Office 3,261,701
Patented July 19, 1966

3,261,701
COMPOSITION OF MATTER CONTAINING ALUMINUM NITRIDE AND ALUMINUM BORIDE
Carl A. Grulke, Berea, Ohio, assignor to Union Carbide Corporation, a corporation of New York
No Drawing. Filed July 19, 1961, Ser. No. 125,070
4 Claims. (Cl. 106—65)

This invention relates to a composition of matter which is chemically and thermally stable, and refers more particularly to a composition of matter having therein as essential constituents aluminum nitride and aluminum boride and to methods of making the same.

The composition of the present invention is chemically and thermally stable, and has certain outstanding properties which render it desirable for use in many fields, especially in the refractory field. As used herein, chemically and thermally stable means more resistant in general to chemical change and to thermal physical deterioration than ordinary materials, such as iron, aluminum, and the like.

Materials for use in the refractory field must be able to withsand exposure to high temperatures without undue chemical and physical change. Included among the desirable characteristics of these materials is an ability to resist a sudden change in temperature without cracking or deteriorating, a relatively high mechanical strength over a wide range of temperatures, resistance to corrosion and oxidation, and a density and hardness which varies with the specific use of the materials.

Boron nitride, which is known as a refractory material, has been considered by the prior art to be very resistant to chemical reaction with molten aluminum. It has been discovered that this resistance is due to a passive surface layer on the boron nitride rather than to the inherent properties of boron nitride. If this layer is removed, boron nitride will react with molten aluminum, and the reaction forms a composition which is so chemically and thermally stable that it is inert to molten iron and aluminum at temperatures as high as 1800° C. Moreover, this composition has other outstanding properties, such as high strength and high electrical restivity, which will be discussed below.

It is an object of the invention to provide a new composition of matter which has unusual and distinctive properties.

It is another object of the invention to provide chemically and thermally stable bodies or shapes having a particular combination of properties heretofore unavailable in such bodies.

It is another object of the invention to provide methods of making a new and distinctive composition of matter.

It is another object of the invention to provide new cementing compositions and new methods for cementing refractory articles together.

It is another object of the invention to provide a new bonding agent for boron nitride particles.

The above objects are achieved by the invention which comprises a new composition of matter having therein as essential constituents aluminum nitride and aluminum boride. The invention also comprises methods of making the same.

As stated above, commercially available boron nitride has a passive layer on its surface. It is believed that this layer consists of the oxides and hydrates of boron. If the layer is not removed from the boron nitride, molten aluminum in contact with the boron nitride will react with this surface layer to form another surface layer of aluminum oxide. This latter layer is even more passive to aluminum than the original layer. However, if the surface layer is first removed from the boron nitride, molten aluminum will react with the boron nitride to form aluminum nitride and aluminum boride.

The passive surface layer can amount to a substantial percentage of the total weight of the boron nitride. For example, the weight of boron and nitrogen in commercially available boron nitride frequently amounts to less than 85% of the total weight of the boron nitride, the remainder being impurities and the passive surface layer. In order to obtain the product of the invention, boron nitride having a purity by weight of at least 98% is required, and boron nitride having a purity in excess of 99% is preferred. Boron nitride having a purity by weight of at least 98% is hereinafter referred to as pure boron nitride. The method used herein to produce pure boron nitride from otherwise impure boron nitride comprises firing the impure boron nitride at about 2000° C. for at least about three hours in a reducing atmosphere, such as an atmosphere of nitrogen and hydrogen in approximately a 9 to 1 volumetric ratio respectively.

Instead of using only pure boron nitride in the reaction, a substitute for all or part of the boron nitride may be used. This substitute consists of the reaction product of an organic diamine, such as ethylene diamine and urea, and boric oxide when the diamine and boric oxide are mixed and heated together in an ammonia atmosphere to a temperature between about 250° C. and about 300° C. During this step, the oxygen of the boric oxide is removed as water. Also, to insure complete removal of the oxygen, the presence of ammonia is desirable. Boric acid may be used in place of the boric oxide, or a combination of the two may be used. The composition of this reaction product has not been determined due to its complexity, but the reaction product appears to be a boron-nitrogen-hydrogen compound having a ring structure similar to a 1,2,4-triazole.

There are two separate methods for making articles having therein aluminum nitride and aluminum boride in accordance with the invention. These are referred to as the "immersion" process and the "compacted powder" process. In the immersion process now to be described, the articles are made by molding pure boron nitride particles into an article of the shape desired and then immersing the article in a molten aluminum bath under a reducing atmosphere for a time sufficient to react the pure boron nitride with the aluminum. It is to be understood that the same result can be obtained by molding low purity boron nitride and then purifying it before immersion in molten aluminum.

The bath should be maintained at a temperature between about 1375° C. and about 1500° C. The reaction of boron nitride and aluminum commences at about 1375° C., and the maximum rate of reaction occurs at about 1500° C. At temperatures somewhat higher than 1500° C., the rate of reaction seems to be offset by a rate of decomposition.

A bonding agent may be blended with the boron nitride before molding into the desired shape. A small addition of boric oxide, and/or boric acid, and an organic amine has been found to be very satisfactory for this purpose. This addition not only aids in bonding the boron nitride during pressure molding, but it also supplies a bond which will not volatilize when the boron nitride is fired at high temperatures.

When the pure boron nitride article is immersed in the molten aluminum bath, the aluminum diffuses into the article and reacts with the boron nitride to form aluminum nitride and aluminum boride. In this process, the porosity of the boron nitride article determines the amount of aluminum available for reaction, i.e., the amount of aluminum which can diffuse into the article.

It is believed that the reaction initially proceeds according to the following equation:

$$2BN + 3Al \rightarrow 2AlN + AlB_2$$

However, the AlB$_2$ in the reaction product is stable only in the presence of excess aluminum. If the amount of aluminum present is limited, the AlB$_2$ decomposes according to the following general equation:

$$AlB_2 \rightarrow 1/aAlB_{2a} + a - 1/aAl$$

wherein "$a$" is in an integer from 1 to 6 and depends upon the amount of aluminum available for reaction.

The aluminum freed by this decomposition can then react with the remaining boron nitride to start the process over again. The formation of aluminum nitride generally proceeds in accordance with the first equation.

The limiting reaction for the formation of AlB$_{12}$ by a combination of the above equations can be represented by the following stoichiometric balance:

$$2.83BN + 3Al \rightarrow 2.83AlN + 0.17AlB_{12} + 0.79B$$

The boron in the product of the above equation is believed to result from a dissociation of boron nitride when there is a limited amount of aluminum present.

In accordance with the above equation, the maximum and minimum weight ratios of aluminum nitride to aluminum boride in the final product are respectively about 4.5 to 1 and about 1.6 to 1. These figures are substantiated by experiments which will be shown below.

After the reaction, the article appears to be composed of a continuous phase of aluminum nitride with inclusions of aluminum boride. Of course, boron nitride, aluminum oxide, boron, aluminum, and various impurities can also be present depending on the quantity and quality of the starting materials.

In the compacted powder process of the invention, particulate pure boron nitride is blended with particulate aluminum, and the blend is molded into an article of the shape desired. A suitable bonding agent may be added before molding if desired. The article is then fired at a temperature between about 1375° C. and about 1500° C. in a reducing atmosphere for a time sufficient to react the boron nitride with the aluminum, usually about one hour.

The weight ratios of boron nitride and aluminum in the blend can vary between 1 part boron nitride to 1 part aluminum and 1 part boron nitride to 3 parts aluminum. With the 1 to 1 ratio, there will be a small amount of boron nitride remaining unconverted after the reaction. With the 1 to 3 ratio, about 35% by weight of the final article will be unconverted aluminum metal.

The articles made in this manner are similar to the articles made by the process first described, but this latter process permits the production of large and irregularly shaped articles more conveniently. Also, in the latter process, the reaction proceeds to completion more readily.

If an excess of aluminum is used in the reaction, the article will contain free aluminum. In this case, the finished article will have higher flexural strength at room temperatures and up to about 1000° C., but will not be as chemically and thermally stable. It has been determined that with up to about 35% by weight free aluminum in the final article the chemical and thermal stabilities of the article are not seriously impaired.

As stated above, the reaction product of an organic diamine and boric oxide or boric acid can be substituted for all or part of the pure boron nitride in the practice of the above processes. When this reaction product is heated with aluminum to a temperature between 1375° C. and 1500° C., an aluminum nitride-aluminum boride composition is formed. A mixture which is suitable for the compacted powder process may consist of particulate pure boron nitride, aluminum metal, and this reaction product. The weight of the aluminum in the mixture should be between a stoichiometric weight and a stoichiometric weight plus an excess which will amount to 35% by weight of the final article.

It is believed that this reaction product of a diamine and boric oxide is converted to boron nitride before the reaction with aluminum since the reaction product is converted rapidly to boron nitride at about 1000° C. and the reaction with the aluminum commences at about 1375° C. A final article made in this way has a high porosity due to the weight loss of volatile compounds when the reaction product is converted into boron nitride. If an article with high porosity is desirable for a specific application, this method may be the most desirable.

The following are specific examples of the above discussed methods:

Example I

Low purity boron nitride powder of a particle size that will pass through a 325 mesh Tyler screen was mixed with a 3% addition by weight of a 1 to 1 molar ratio mixture of boric oxide and ethylenediamine. This total mixture was heated to 300° C. in ammonia to react the boric oxide and the ethylene diamine. The mixture was cooled in ammonia to room temperature and then pressed into 2 inches by 1 inch by 1 inch blocks in a steel mold under pressures ranging from 1250 to 5000 p.s.i.

The blocks were fired for 72 hours at 1000° C. in an atmosphere of ammonia and then cooled to room temperature in the same atmosphere. The blocks were fired again for 3 hours at 2000° C. in an atmosphere consisting of a 9:1 volumetric mixture of nitrogen and hydrogen respectively. The blocks were cooled in this atmosphere to room temperature and then immersed in a molten aluminum bath at 1500° C. for three hours, during which time the atmosphere surrounding the bath was composed of argon and hydrogen in a 9:1 volumetric ratio respectively. After removal from the bath, the blocks were wiped to remove excess aluminum.

The chemical analysis, density, and fluxural strength of the blocks are listed in Table I.

TABLE I.—COMPOSITION AND PROPERTIES OF ARTICLES CONTAINING AlN AND AlB$_x$

| Porosity of BN Blocks Before Immersion | Final Equivalent Composition,[a] percent | | | | | Final Properties | | |
|---|---|---|---|---|---|---|---|---|
| | AlN | AlB$_2$ | AlB$_{12}$ | Al | B[b] | Apparent Density, g./cc. | Resistivity, ohm-cm. | Flexural Strength, p.s.i. |
| 64% | 47.5 | 23.2 | | 26.9 | | 2.82 | 0.00001 | 65,400 |
| 55% | 60.5 | 26.2 | | 8.3 | | 2.80 | 0.00005 | 47,000 |
| 38% | 83.8 | | 16.6 | | 1.3 | 2.72 | 1.2 | 20,000 |

[a] Final composition calculated from an analysis by element.
[b] Some of the boron is present as unreacted BN.

Example II

Boron nitride powder which had been purified by firing at 2000° C. for 3 hours in an atmosphere of nitrogen and hydrogen in a 9:1 volumetric ratio respectively was blended with a 3% addition by weight of a 1 to 1 molar ratio mixture of boric oxide and ethylene diamine. The mixture was heated to 300° C. in an atmosphere of ammonia and then cooled to room temperature. The mixture, a fine powder, was blended with aluminum particles of a size which would pass through a 325 mesh Tyler screen. A series of blends containing various percentages of aluminum were pressed at 16,000 p.s.i. at room temperature into blocks. In some instances, one drop of ethylene diamine was added per gram of boron nitride to improve the moldability. The pressed blocks were then fired in a 9:1 argon-hydrogen atmosphere for one hour at 1500° C. The initial blend compositions and the final properties of the blocks are shown in Table II.

TABLE II.—COMPOSITION AND PROPERTIES OF ARTICLES CONTAINING AlN AND $AlB_x$

| Ratio by weight of BN to Al in Initial Mix | Final Equivalent Composition,[a] percent | | | | | Final Properties | | |
|---|---|---|---|---|---|---|---|---|
| | AlN | $AlB_2$ | $AlB_{12}$ | Al | B[b] | Apparent Density, g./cc. | Resistivity, ohm-cm. | Flexural Strength, p.s.i. |
| 1 to 1 | 72 | | 14 | | 14 | 1.70 | $1 \times 10^{10}$ | (c) |
| 1 to 1.5 | 63.8 | 32.8 | 2.5 | | .8 | 1.75 | $1.5 \times 10^4$ | 8,400 |
| 1 to 3 | 41.0 | 24.5 | | 34.5 | | 1.86 | $12 \times 10^{-5}$ | 21,700 |

[a] Final composition calculated from an analysis by element.
[b] Some of the boron is present as unreacted BN.
[c] Not measured.

The products and methods of the invention can be used to cement articles together, especially articles basically composed of boron nitride and aluminum nitride, or basically composed of aluminum nitride and aluminum boride. In this case, a cementing mixture is made of stoichiometric quantities of particulate aluminum, particulate pure boron nitride, boric oxide and/or boric acid, and an organic amine, such as ethylene diamine. A paste is made of the mixture by adding a suitable liquid, such as ethylene diamine. The paste is applied to the abutting surfaces of the articles to be joined, and the articles are clamped together. Next, the assembly of articles is fired at a temperature between 1375° C. and 1500° C. in a reducing atmosphere for a time sufficient to complete the reaction, usually about one hour.

The strength of a joint made in this manner is usually less than the strength of the articles joined, but assemblies of tubes cemented end to end have been found to be very durable when used as thermocouple insulators in molten steel at 1500° C.

The following example illustrates more specifically the above method of cementing articles together:

*Example III*

An aluminum nitride-aluminum boride composition as described herein was made into refractory tubes which were 6 inches long, 2 inches in outside diameter, and 1 inch in inside diameter. 1.5 parts aluminum, 1 part pure boron nitride powder, and 0.5 part of boric oxide were blended, and the blend was wetted with a sufficient quantity of ethylene diamine to provide a smooth paste.

This paste was applied to the proper ends of the tubes to be joined, and the tubes were clamped together. The assembly was heated for about one hour at about 300° C., and then the assembly was fired at about 1500° C. for one more hour. In both, the assembly was surrounded by a nitrogen-hydrogen atmosphere. After cooling, the joints could withstand flexural pressures of about 3000 to 4000 p.s.i.

The compositions and methods of the invention can also be used to bond refractory particles together. Such refractory materials as titanium diboride, aluminum nitride, boron nitride, silicon carbide, titanium carbide, graphite, and the like can be included in the original mix of pure boron nitride and aluminum.

After the boron nitride and aluminum react, it has been found that the aluminum nitride forms a continuous phase throughout the final article and surrounds the particles of aluminum boride formed and the refractory particles present, thereby bonding the entire composition. This permits the production of articles with a variety of compositions and properties.

The compositions and methods of the invention can also be used to form protective coatings on various articles. For example, a mixture of aluminum and pure boron nitride can be placed on the surface of an article, and then heated to form a layer of the aluminum nitride-aluminum boride composition of the invention over the article's surface. Also, an article having pure boron nitride bonded to its surface can be immersed in molten aluminum to obtain a similar result. In view of the refractory nature of the compositions of the invention, and in view of their physical and chemical characteristics stated herein, a surface coating made of such a composition obviously imparts new characteristics and a refractory nature to an article on which it is coated.

It is obvious that the present invention provides a variety of chemically and thermally stable compositions that are suitable for innumerable uses. For example, the compositions can be used as refractory articles, abrasive articles, electrical resistors, diffusion and filtering media, and insulation materials. Moreover, the articles of the invention can be easily made into almost any shape that is desired.

What is claimed is:

1. A chemically and thermally stable composition of matter consisting essentially of aluminum nitride and aluminum boride, said aluminum nitride forming a substantially continuous phase throughout said composition.

2. A chemically and thermally stable composition of matter consisting essentially of aluminum nitride, aluminum boride, and up to about 35% by weight of aluminum metal, the weight of said aluminum nitride being from about 1.6 to about 4.5 times greater than the weight of said aluminum boride.

3. A chemically and thermally stable composition of matter consisting essentially of aluminum boride, aluminum nitride, and up to about 35% by weight aluminum metal in the form of finely divided particles, said aluminum nitride forming a substantially continuous phase throughout said composition, and the weight of said aluminum nitride being from about 1.6 to about 4.5 times greater than the weight of said aluminum boride.

4. A chemically and thermally stable body consisting essentially of a substantially continuous phase of aluminum nitride, inclusions of aluminum boride, and up to about 35% by weight inclusions of aluminum metal, the weight of said aluminum nitride being from about 1.6 to about 4.5 times greater than the weight of said aluminum boride.

References Cited by the Examiner

UNITED STATES PATENTS

| | | | |
|---|---|---|---|
| 2,408,332 | 9/1946 | Morgan | 260—551 |
| 2,839,413 | 6/1958 | Taylor | 106—65 |
| 2,883,297 | 4/1959 | Jeitner | 106—65 |
| 2,996,106 | 8/1961 | McCarthy et al. | 156—89 |
| 3,023,115 | 2/1962 | Wainer et al. | 106—65 |
| 3,025,204 | 3/1962 | Heintz | 156—89 |
| 3,084,060 | 4/1963 | Baer et al. | 106—65 |

TOBIAS E. LEVOW, *Primary Examiner.*

EARL M. BERGERT, *Examiner.*

W. B. WALKER, J. POER, *Assistant Examiners.*